March 12, 1963 L. VADAS 3,080,903
HALVING MECHANISM FOR PEACH PITTING MACHINE
Filed June 24, 1958 4 Sheets-Sheet 1
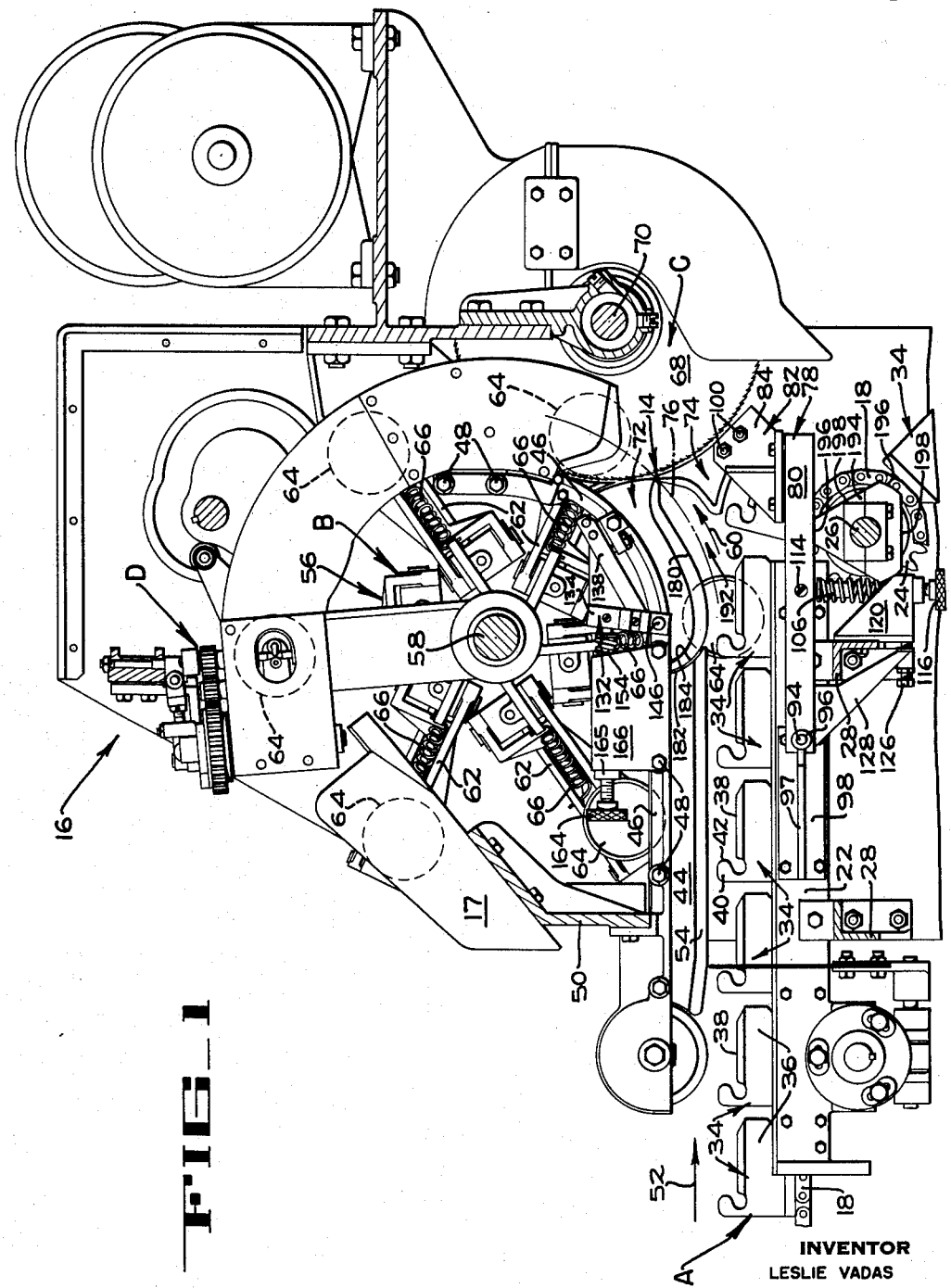
FIG_1
INVENTOR
LESLIE VADAS
BY *Hans G. Hoffmeister*
ATTORNEY March 12, 1963 L. VADAS 3,080,903
HALVING MECHANISM FOR PEACH PITTING MACHINE
Filed June 24, 1958 4 Sheets-Sheet 2
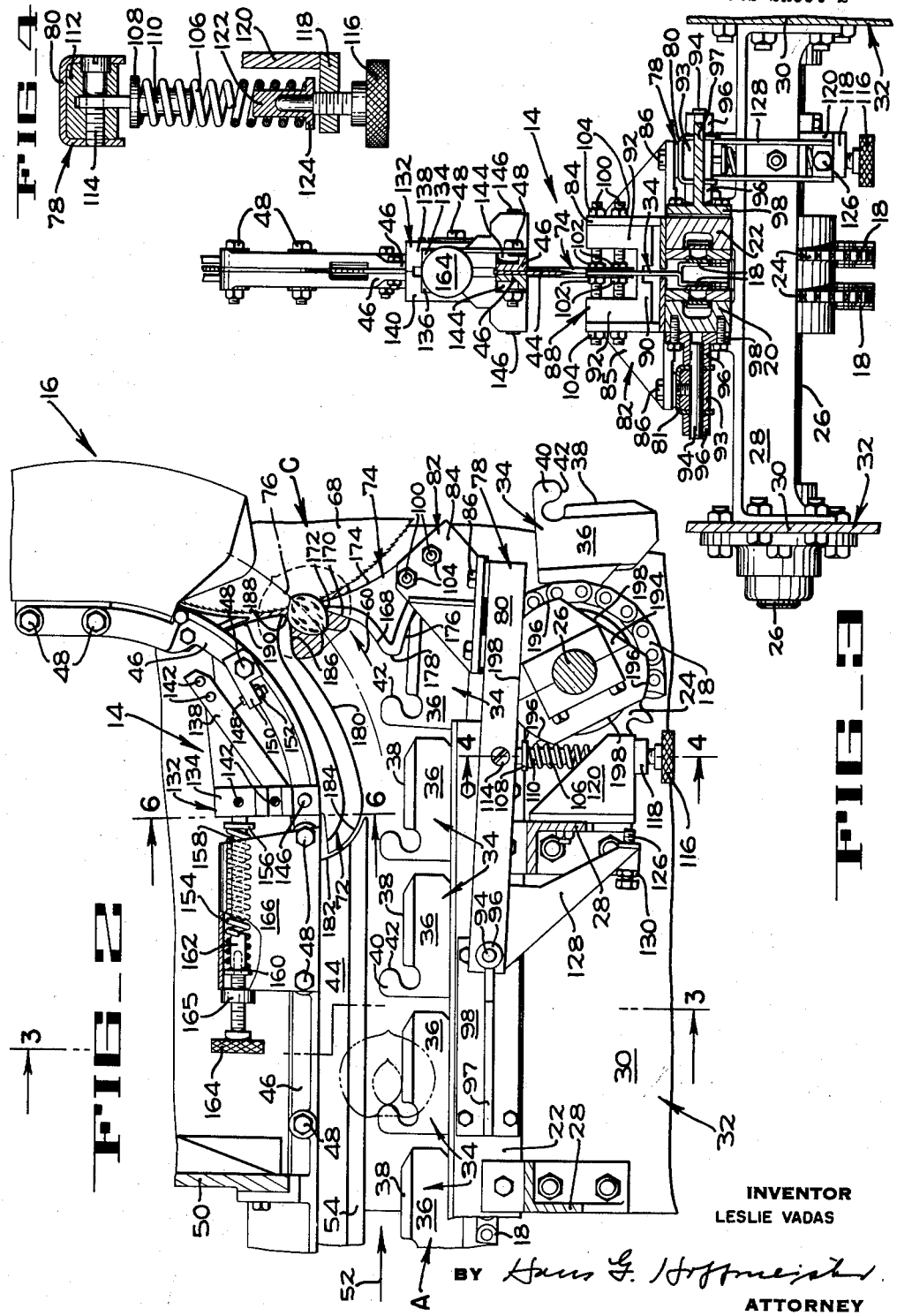
INVENTOR
LESLIE VADAS
BY *Hans G. Hoffmeister*
ATTORNEY

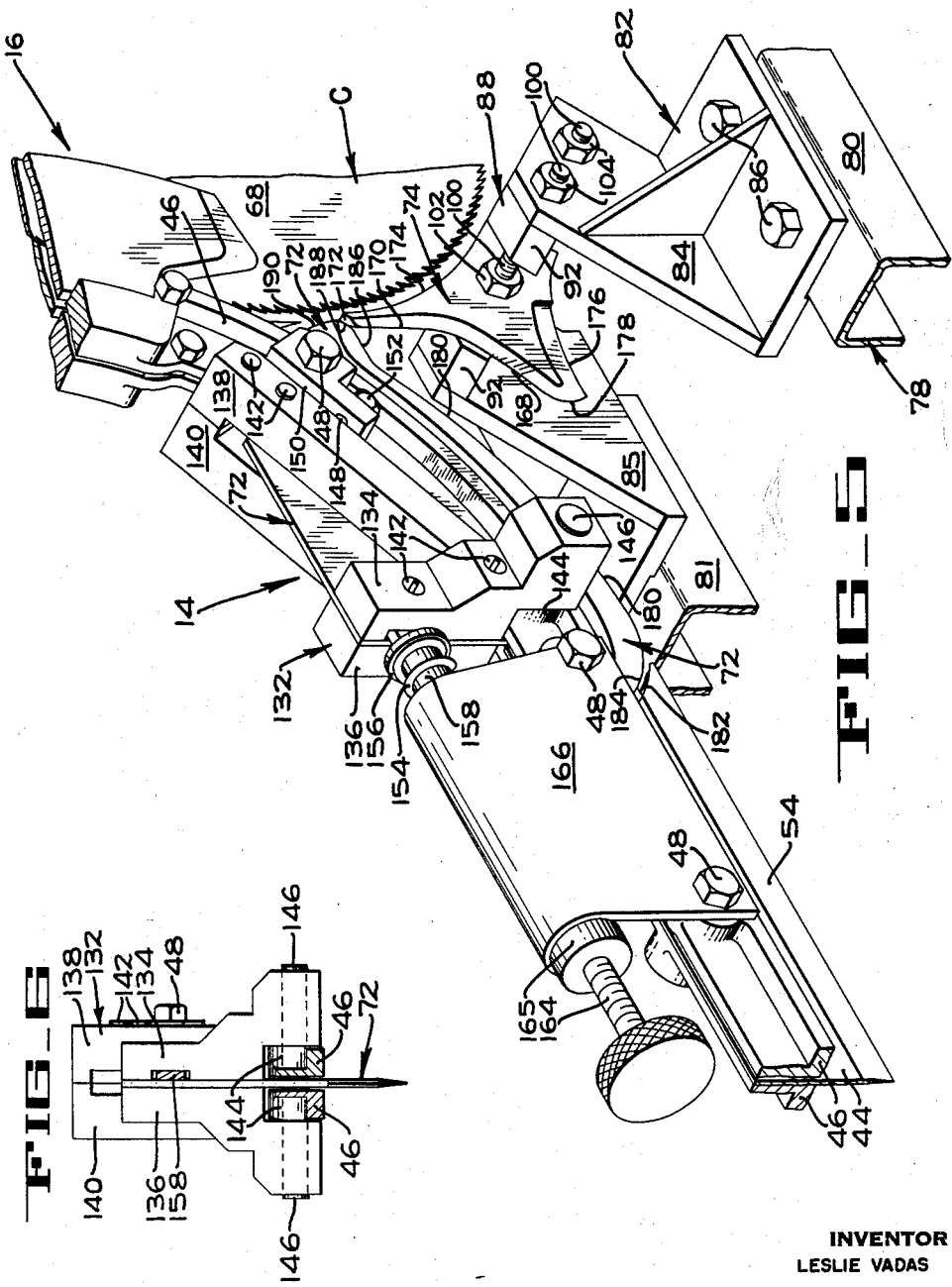

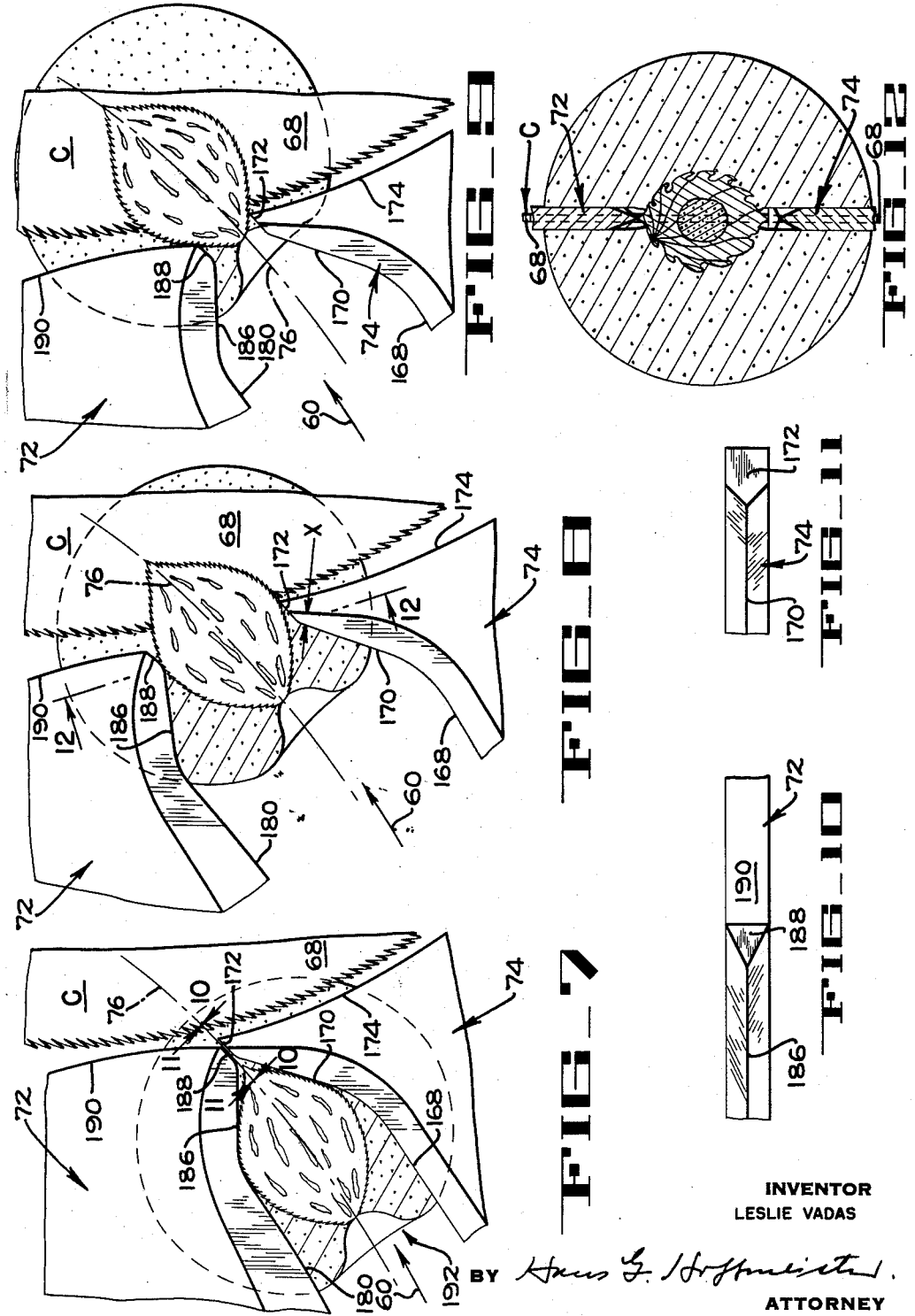

United States Patent Office 3,080,903
Patented Mar. 12, 1963

3,080,903
HALVING MECHANISM FOR PEACH PITTING MACHINE
Leslie Vadas, Los Gatos, Calif., assignor to FMC Corporation, a corporation of Delaware
Filed June 24, 1958, Ser. No. 744,172
3 Claims. (Cl. 146—73)

The present invention appertains generally to apparatus for preparing fruit and more particularly to an improved fruit preparation machine of the type in which drupaceous fruit and its pit are cut in half before the fruit is pitted.

When drupaceous fruit such as cling peaches are processed by machines of the above-mentioned type, the peaches are usually cut in half preceding the pitting operation by use of a serrated blade such as a circular saw blade. The saw blade not only leaves the cut surfaces of the peach halves rough and unsightly but additionally and most important the saw, because of its thickness, cuts away and wastes a certain percentage of the peach meat.

One object of the present invention is to provide an improved apparatus for halving fruit of the variety mentioned.

Another object is to provide an improved peach pitting machine in which substantially none of the fruit meat is wasted during the severing operation and the meat of the halves is smoothly cut.

Another object is to provide means in a peach pitting machine to form an encircling slit or incision in the meat of the peach preceding the severing of the pit.

Another object is to provide means in a machine of the above-mentioned type for spreading the meat of the fruit laterally out of the path of movement of the pit-severing saw blade.

These and other objects and advantages of the present invention as well as the manner in which it is employed will become apparent from the following description and the accompanying drawings in which:

FIG. 1 is a fragmentary vertical longitudinal section of a peach pitting machine embodying the apparatus of the invention.

FIG. 2 is a view similar to FIG. 1 but showing particularly the apparatus of the invention at enlarged scale.

FIG. 3 is a fragmentary transverse section of the peach pitting machine shown in FIG. 2, taken along the lines 3—3 thereof.

FIG. 4 is an enlarged vertical section taken along the lines 4—4 of FIG. 2.

FIG. 5 is a perspective showing in particular the upper part of the apparatus of the invention and looking at the same from above and from one side.

FIG. 6 is an enlarged section taken substantially along the lines 6—6 of FIG. 2.

FIGS. 7, 8 and 9 are enlarged fragmentary elevations showing successive operational positions, respectively, of a part of the apparatus of the invention.

FIG. 10 is an enlarged fragmentary elevation taken looking in the direction of the arrows 10—10 of FIG. 7.

FIG. 11 is an enlarged fragmentary elevation taken looking in the direction of the arrows 11—11 of FIG. 7.

FIG. 12 is a section taken transversely of the structure shown in FIG. 8 along the lines 12—12 thereof.

As shown best in FIG. 1, the peach precut apparatus 14 of the invention is arranged to be attached to and become part of a pitting machine 16 such as that disclosed in Patent No. 2,376,526 of Albert R. Thompson for Continuous Peach Pitter. Since the peach precut apparatus 14 comprises an improvement to the machine of the patent, the precut apparatus only will be described in detail herein, it being understood that reference may be had to the above-identified patent for a more thorough understanding of the peach pitter 16.

Again referring to FIG. 1, the continuously operated fruit pitting machine 16 generally comprises a first fruit conveying and feeding means A. A second conveyor or fruit transfer means B, comprising a turret having a series of cooperating pairs of fruit transfer cups, is provided adjacent the conveyor A. As the fruit is advanced by the first conveyor A, the flesh of the fruit is cut at opposite sides along the suture plane. Each fruit, with its flesh thus cut, is grasped by a cooperating pair of cups of the second conveyor B and is removed from the first conveyor A and carried by the conveyor B to and beyond a fruit halving means C. After the fruit is severed by the fruit halving means C, it is carried by the rotary transfer means B to a pitting means D where the halved pit sections are removed from the fruit halves. Thereafter, the pitted fruit halves are dropped from the transfer means B into a discharge chute 17.

Two substantially identical chains 18 (FIGS. 2 and 3) of the first conveyor A have their upper flights supported and guided by similar tracks 20 and 22, respectively. At the discharge end of conveyor A, the chains 18 are trained about a multiple sprocket 24 that is secured in driving engagement to a drive shaft 26 of the peach pitting machine 16. The oppositely disposed conveyor tracks 20 and 22 are substantially horizontal and are fixed to suitable transverse beams 28 that rigid with opposite side plates 30 of a pitter frame structure 32.

The chains 18 of the first conveyor A are provided with a plurality of equally spaced upstanding blades 34 upon which individual peaches are impaled and by which the impaled peaches are carried to the transfer means B. Each of the movable impaling blades 34 has somewhat the appearance of an open hand with an upwardly projecting thumb and, as shown best in FIG. 2, the blades 34 each have a vertical impaling section 36 with a horizontal cutting edge 38 along a part of the top edge. The upwardly projecting thumb has a generally horizontally projecting part 40 with a rounded stem end locating nose 42 that is spaced above the cutting edge 38. In feeding fruit such as cling peaches to the pitter 16 the operator, while grasping a peach in both hands, will orient the fruit so that its suture plane is vertical. Then, while holding the fruit in such a position, the operator lowers the fruit into the path of one of the impaling blades 34 so that the stem end locating nose 42 enters the stem-end indent of the peach and contacts the pit. The peach is then pivoted downward about the nose 42 until the cutting edge 38 of the impaling blade 34 cuts into the peach along the suture plane and contacts the pit as shown in phantom lines in FIG. 2.

In order to assure that the peaches thus impaled on the movable blades 34, respectively, remain with their suture planes vertical and properly oriented for severing by the fruit halving means C, a stationary overhead impaling blade 44 is provided. The stationary impaling blade 44, which extends substantially horizontally, is rigidly secured between two angle members 46 (FIG. 3) that are secured, as by bolts 48, in fixed relation to a cross bracket 50 (FIG. 1) of the frame structure 32. Under the bracket 50 the angle members 46 are horizontal and are parallel to the tracks 20 and 22 but, near the fruit halving means C, the angle members are upwardly curved. The stationary blade 44 is thus supported in the vertical plane of the movable impaling blades 34. As the peaches on the movable impaling blades 34 are advanced by the first conveyor means A in the direction of the arrow 52 (FIG. 2), each peach engages the stationary impaling blade 44 so that a knife edge 54 along the bottom thereof cuts into the top of the fruit in the suture plane. The peaches, which are impaled on the cutting edge 38 of the movable impaling blades 34, slide along the stationary blade 44, and in this way the blades 34 and 44 cooperate to positively hold the peaches in alignment with the halving means C.

With reference to the drawings and with the foregoing description in mind it will be evident that the thin blades 44 and 34 above and below the peaches, respectively, make incisions in the suture plane at opposite sides only of the peaches. Since the blades 34 and 44 are thin and do not spread the fruit meat laterally of the slits formed thereby, an amount of meat equal to the thickness of the cut made by the fruit halving means C is usually wasted for each peach pitted. Not only is a certain amount of the fruit meat wasted, but the severed side of each peach half is rough and unsightly. The peach precut apparatus 14 of the present invention, by which these problems are overcome, is interposed in the path of the peaches as they are moved by the fruit transfer means or second conveyor B between the conveyor A and the halving means C.

The fruit transfer means B comprises a turret 56 (FIG. 1) that is rotatable with a driven shaft 58 of the pitter 16 in the direction of the arrow 60 and in timed relation with respect to the conveyor drive shaft 26. The turret 56 comprises a plurality of cooperating pairs of arms 62 (only the arms at one side of the turret being shown in FIG. 1), with each arm having a fruit gripping cup 64 at its outer end. The two opposed and cooperating cups 64 of each pair of arms 62, while in the six o'clock position (FIG. 1), are urged toward each other by suitable springs 66 so that a particular pair of cups 64 grasps a peach carried by whichever one of the movable impaling blades 34 happens to register with that particular pair of cooperating cups 64 at that time. Thereafter the peach, while held in the cups 64, is advanced in the direction of the arrow 60 (FIGS. 1 and 2) to and beyond the halving means C. The fruit halving means C comprises a circular blade 68 having suitable saw teeth about its periphery. The blade 68 is secured to a high speed shaft 70 of the peach pitter 16 for rotation in the plane of the impaling blades 34 and 44.

As best shown in FIG. 1, the peach precut apparatus 14 of the invention comprises an upper blade 72 and a lower blade 74 which are disposed in spaced relation in the vertical plane of the two impaling blades 34 and 44 above and below the peach carried in a pair of cooperating cups 64 in the direction of the arrow 60. One of the functions of the blades 72 and 74 is to enter the incision made by the blades 34 and 44 and increase the depth of the cut inwardly of the peach substantially to the pit. In addition, the blades 72 and 74 are thicker than the impaling blades 34 and 44 (FIG. 3) as well as thicker than the saw blade 68 (FIG. 12). Therefore, the blades 72 and 74 are effective to spread the meat of the fruit by guiding it laterally of the incision and out of the way of the saw 68 just before the saw enters the incision to cut through the pit. As a result the saw engages only the pit and not the meat of the peach. It is important to observe that the blades 72 and 74 are spaced in front of the saw 68 only very slightly, so slightly, in fact, that throughout the time that the pit is being cut, the blades 72 and 74 continue to spread the meat apart out of the way of the saw, as clearly shown in FIGS. 8 and 9. Hereinafter, in order to identify the blades 72 and 74 and distinguish them from all other blades they will be referred to as spreader blades or guide blades. A peach on the conveyor A, that is grasped by a pair of cooperating cups 64 at the six o'clock or transfer position, will be slid off the impaling blades 34 and 44 and slid onto the spaced upper and lower spreader or guide blades 72 and 74 as the turret 56 turns in the direction of the arrow 60. The blades 72 and 74, which are disposed in a vertical plane, act as guides to prevent lateral shifting of peaches moved therealong by the conveyor B. The pair of cups associated with each peach will thus be prevented from shifting transversely of the conveyor A by the guiding action of the blades 72 and 74 and will advance the peach in centered relation with respect to the saw 68. It will be apparent, therefore, that the pairs of cups 64, moving in the direction of the arrow 60, and the blades 72 and 74 cooperate to define an arcuate path, as indicated in FIG. 1 by the broken line 76, along which the peaches are moved between the impaling blades 34 and 44 and the saw 68.

The lower guide blade 74 is mounted for movement toward and away from the pit by means of a support unit 78 which comprises two aligned side arms 80 and 81 (FIGS. 2 and 3) that are interconnected at one end by a tie beam 82. The tie beam 82 includes two spaced upstanding buttresses 84 and 85 that are attached as by bolts 86 to the side arms 80 and 81, respectively. Located between the buttresses is a U-shaped spacer 88 (FIG. 3) having a bight 90 and upstanding legs 92. The legs 92 are fixed to the spaced buttresses 84 and 85 to effect their rigid interconnection and thus provide the tie beam 82.

As seen in FIG. 3, the side arms 80 and 81 are channel members, and a block 93 is welded in each channel at the end of the channel that is opposite to the end connected to the tie beam 82. A short shaft 94 (FIG. 3), that projects to opposite sides of the channel, is secured by a setscrew to each block 93 and the projecting ends of each shaft 94 serve as trunnions that are journaled in a pair of spaced bearing sleeves 96, respectively. Each pair of bearing sleeves 96 projects laterally of the conveyor A and are held in spaced relation by a web 97 of a bracket 98, which is fixed to the adjacent chain track 20 or 22. With this arrangement the support unit 78 is pivotally mounted on the frame.

The lower guide blade 74, which is of suitable plate material, has spaced holes (not shown) through which two similar screw shafts 100 extend. The shafts 100 extend transversely with respect to the line of travel of the peaches and are received in apertures (not shown) in the spaced legs 92 of the U-shaped spacer 88 and the buttresses 84 and 85 of the tie beam 82. Nuts 102 on the screw shafts 100 at each side of the lower guide blade 74 adjustably secure the same in vertical position on the screw shafts. Other nuts 104 on the ends of the screw shafts 100 are set in binding relation and in opposition to each other on the outer sides of the buttresses 84 and 85 to adjustably attach the guide blade 74 to the support unit 78.

It will be apparent from the foregoing description directed to the mounting of the lower guide blade 74 that the same can be adjusted laterally with respect to the vertical plane of the impaling blades 34 and 44 by suitable manipulation of the nuts 102 and 104 on the screw shafts 100 so as to align the guide blade 74 with the plane of the impaling blades. Moreover, the lower guide blade 74 is vertically movable by virtue of the pivotal connection of the support unit 78 in the bearing sleeves 96 of the brackets 98 on the conveyor tracks 20 and 22.

A resilient mounting is provided for the blade support unit 78 by a helical compression spring 106 that bears with its upper end (FIGS. 1, 2 and 4) against a flange 108 on a stud 110. The upper end of the stud 110 is pivoted in a slotted block 112 fixed in the channel shaped arm 80 (FIGS. 2 and 4) of the blade support unit 78 by a bolt 114 which also acts as a pivot pin. At the lower end of the spring 106 is a vertical adjusting screw 116 that is threaded through a boss 118 of a bracket 120 fixed to the adjacent transverse beam 28 (FIG. 2) of the frame structure 32. The upper end of the screw 116 is rounded and is provided with a freely rotatable cap 122, that projects within the adjacent end of the spring 106 and has a flange 124 on the cap 122 against which the spring bears. By proper adjustment of the screw 116, the desired resiliency of the blade support unit 78 can be obtained.

A set screw 126 is provided to determine the upper position into which the blade support unit 78 can be urged by the spring 106. The set screw 126 is located adjacent the bottom of the bracket 120 and is threaded substantially horizontally through the lower end of an extension 128 that projects downward from the support arm 80 (FIGS. 2 and 3). The resiliency of the spring 106 normally urges the tip of the set screw 126 into contact with the bracket 120. After adjusting the set screw 126 to determine the upper position of the support 78, the screw 126 may be locked in place by a nut 130 threaded onto the screw 126.

The upper guide blade 72 (FIGS. 1 and 2), which is disposed above the arcuate path of the peach as indicated by the broken line 76, is pivotally mounted on the angle members 46 in the upwardly curved part of the angle members adjacent the end of the stationary impaling blade 44 near the cutting blade 68. The guide blade 72 is rigidly clamped between the assembled halves of a split mounting bracket 132 (FIGS. 5 and 6) which comprises a structure of inverted Y shape having opposite arms 134 and 136 and blade strengthening projections 138 and 140, respectively, that extend upwardly and toward the blade 68. The halves of the bracket are connected by a plurality of bolts 142 in clamping relation to the blade 72 so that the arms 134 and 136 of the bracket project laterally of the blade 72 to opposite sides thereof. The arms 134 and 136 (FIG. 6) are located adjacent transversely aligned bosses 144 on the angle members 46. A pin 146, received in suitable openings in the aligned bosses 144 and the aligned bracket arms 134 and 136, pivotally mounts the bracket 132 on the angle members 46. When the bracket 132 is thus pivotally mounted, the blade 72 is freely movable between the suitably spaced angle members 46 (FIG. 6).

The projection 138 of the Y-shaped bracket 132 overlies a set screw 148 (FIG. 2) threaded through a bracket 150 that is fixed by one of the bolts 48 to the adjacent angle member 46. Downward movement of the blade 72 is limited by means of the set screw 148. When the desired adjustment of the blade 72 is obtained by means of the set screw 148, the setting of the same can be secured by means of a lock nut 152 thereon.

The upper guide blade 72 is resiliently urged toward the set screw 148 by a helical compression spring 154 (FIGS. 2 and 5) that bears at one end against a circular flange 156 of a stud 158 that is pivotally attached to the bracket 132 by means of one of the bolts 142. The other end of the spring 154 bears against a flange 160 of a freely rotatable cap 162 disposed on the end of an adjusting screw 164 that is threaded through a collar 165 carried by a support plate 166.

The lower guide blade 74 projects, from its attachment by the screw shafts 100 to the support 78, toward the path of the peach as represented by the broken line 76 (FIG. 1). The blade 74, at its end adjacent the conveyor A, includes a generally arcuate edge part 168 (FIGS. 1 and 2) that is in substantial parallel relation with respect to the broken line 76. Nearer the saw 68, the blade 74 includes another edge part 170 that is substantially straight and is deflected from the arcuate edge part 168 and trends toward the line 76 to a location close to the periphery of the saw 68 at the line 76. An end part or foot 172 of the blade 74 is arcuate and is substantially coincident to the curved line 76 when the blade 74 is in the position shown in FIGS. 1 and 7. At one end, the foot 172 curves into the edge part 170 and, at the other end, the foot terminates at an arcuate side edge 174 that is close to the saw 68. The lower edge 176 of the blade 74 is curved in concentric relation with respect to the drive shaft 26 and is so arranged that when the blade is in the position of FIG. 1, the movable impaling blades 34 will not strike the blade 74 as they swing about the shaft 26 on the sprocket 24.

A knife edge is formed on the lower blade 74 starting at the intersection of the edge parts 170 and 172 (FIG. 7) and continuing along the edge parts 170, 168 and 178 and part way along the lower edge 176. As best shown in FIGS. 7 and 11, the edge or foot part 172 is not sharpened into a knife edge but is left the full thickness of the blade 74 for a purpose to be explained later. The knife edge on the edge part 170 adjacent the edge part 172 is steeply tapered, increasing to the full thickness of the blade 74 in a short distance, indicated by reference letter X in FIG. 8. Progressing from the edge part 172 to the edge part 168 the knife edge is ground back further and the taper of the knife edge becomes progressively more acute. At the intersection of the edge part 168 with the edge 176, the edge portion is formed on a radius to provide an arcuate camming edge 178 for a purpose to be later described.

The upper guide blade 72, which is pivoted about the pin 146, has a central edge part 180 (FIG. 7) that is arcuate and substantially parallels the arcuate path of the peach as represented by the broken line 76. The end 182 (FIG. 2) of the stationary impaling blade 44 adjacent the spreader blade 72 is cut on a curve that is substantially concentric with the pivot pin 146. Likewise, the edge part 184 of the spreader blade 72, adjacent the end 182 of the impaling blade 44, is arcuate and is also substantially concentric with the pivot pin 146 and blends smoothly into the central edge part 180. Nearer the saw 68, the spreader blade 72 (FIGS. 7, 8 and 9) has another edge part 186 that is substantially straight and is deflected from the central edge part 180 and trends toward the line 76 to a location close to the line 76 and to the periphery of the saw 68 when the blade 72 is in the position shown in FIGS. 1 and 7. The edge part 186 curves into one end of an arcuate edge or foot part 188 (FIGS. 7 and 10) of the blade 72 which is substantially coincident with the curved line 76 when the blade 72 is in the position of FIGS. 1 and 7. At its opposite end the foot 188 intersects an edge or end 190 of the blade 72 which is adjacent the saw 68. The end 190 is arcuate and is substantially concentric with the pin 146 about which the guide blade 72 pivots.

The edge of upper blade 72 is sharpened starting at the intersection of the edge parts 186 and 188 and continuing along the edge parts 186 and 180 and 184. As best shown in FIGS. 7 and 10, the foot part 188 is not sharpened into a knife edge but is left wedge shaped and tapers from the edge part 186 to the full thickness of the blade 72 at the end 190 for a purpose later to be explained. The knife edge on the edge part 186 starting at the foot part 188 is tapered, increasing to the full thickness of the blade 72 in a short distance from the knife edge. Progressing from the edge part 188 to the edge part 180 the edge of the part 180 is ground back progressively further so that the taper of the knife edge is progressively more acute.

When a peach on one of the movable impaling blades 34 approaches the 6 o'clock or transfer position of the rotary transfer means B so as to come into registry with a pair of cooperating cups 64 on the rotary transfer means, the fruit is still impaled partly by the stationary upper blade 44. Shortly thereafter the opposed cups 64, which advance more rapidly than the conveyor A, close in on the peach and grasp the same as the cups 64 are urged laterally of the conveyor A by the springs 66. As the turret 56 continues to turn in the direction of the arrow 60, the peach is removed from the impaling blade 34 along the arcuate line 76 and is slid onto the spreader blades 72 and 74 which prevent lateral displacement of the peach from the plane of the impaling blades 34 and 44. The spreader blades 72 and 74 thus act as guides for the peach while the peach is moving between the blades 34 and 44 and the saw 68. The transfer of the peach from the thin impaling blade 34 and onto the thicker spreader blade 72 is eased by the knife edge on the curved part 184 of the blade 72. After an additional advance of the peach along the arcuate path 76, the lower part of the peach, which has been carreid clear of the movable impaling blade 34, engages the lower spreader blade 74. The peach pit now enters a slot 192 (FIGS. 1 and 7) formed between the adjacent arcuate edge parts 180 and 168 of the upper and lower spreader or guide blades 72 and 74, respectively. The edge parts 180 and 168 of the spreader blades 72 and 74, respectively (FIG. 1), are spaced from each other substantially the same distance as the knife edges 38 and 54 of the impaling blades 34 and 44, respectively, are spaced apart. The knife edge along the lower edge part 176 of the spreader blade 72 assures that the meat on the lower part of the peach will not be torn as the peach is moved onto the lower spreader blade 74. Moreover, the camming edge 178 (FIG. 2) between the edge parts 168 and 176 aids the peach pit in entering the previously mentioned slot 192 between the spreader blades 72 and 74.

Previous to the entry of the pit into slot 192, the spreader or guide blades 72 and 74 are not effective to spread the meat of the fruit adjacent the pit since the blade parts 180 and 168 have thin, flat tapered edges designed for cutting purposes and to act primarily as guides to maintain lateral alignment of the peach in the path 76 while the peach is advanced by the cups 64. During the final movement of a peach along the spreader or guide blades 72 and 74 and immediately preceding engagement of the pit with the saw 68 the complete spreading of the meat is accomplished in the following manner.

As the peach continues to be moved along the arcuate path 76 in the direction of the arrow 60, the meat at the leading or blossom end of the peach and in the suture plane thereof will be slit or incised by the knife edges of the steeply converging edge parts 186 and 170, respectively. It will be apparent that, since the spreader blades 72 and 74 are thicker than the saw blade 68 (FIG. 12), the flesh of the peach will be pressed laterally by the spreader blades to each side of the saw blades 68 as the peach continues to be advanced to the halving means C. When the more or less pointed blossom end of the peach pit comes to the end of the slot 192 (FIGS. 1 and 7) and engages the converging edge parts 186 and 170, the meat at the leading side of the peach will be cut substantially to the pit. Additionally, because of the steep taper of the cutting edge of the edge parts 186 and 170 of the spreader blades 72 and 74, respectively, in the region of the foot parts 188 and 172, the meat is first spread at the leading end of the peach to the full thickness of the spreader blades 72 and 74 substantially to the pit. In this way the meat of the peach passes to each side of the saw 68 (FIG. 12) so that the teeth thereof do not touch or cut into the meat to leave the cut halves of the peach unsightly. Further movement of the peach along the path 76 causes the pit to cam the spreader blades 72 and 74 (FIGS. 2 and 7) outwardly against the resilient force of their return springs 154 and 106, respectively. The blunt, unsharpened and wedge shaped foot parts 188 and 172 of the spreader blades 72 and 74, respectively, by which the fruit meat is fully spread completely to the pit now come into action. As the leading end of the pit is moved into engagement with the saw blade 68 (FIG. 8), the pointed portions at the intersection of the edge parts 186 and 170 with the foot parts 188 and 172, respectively, engage the pit and follow along its curvature as the blades 72 and 74 are urged toward each other by the springs 154 and 106. With reference to FIGS. 8 and 12, the entire flat triangular surface of the foot parts 188 and 172 come very close to the pit starting at the blossom end thereof, and thus the fruit meat is progressively spread to the full thickness of the spreader blades 72 and 74 substantially to the pit.

When the blades 72 and 74 approach each other (FIG. 9) as the stem end of the pit passes from between the spreader blades 72 and 74, the knife edge on the converging edge parts 186 and 170 complete the encircling incision in the meat along the suture plane of the peach. Simultaneously, the blunt foot parts 188 and 172 complete the spreading of the peach meat laterally beyond the cutting edge of the saw blade as the cooperating cups 64 complete movement of the peach onto the saw 68 along the path 76. Since the meat of the peach is spread laterally of the incision on the suture plane of the peach by the action of the spreader blades 72 and 74, the saw 68 severs the pit only and has no opportunity to cut the fruit meat. Therefore, the meat of the peach is not wasted nor is it roughened by possible engagement by the teeth of the saw blade.

The peach continues to be carried by the cups 64 during completion of the peach pitting operation in a manner disclosed in the before-mentioned patent.

It will be seen upon reference to FIG. 2 that, after a peach has been removed from a particular impaling blade 34, the pit of the peach advancing in the direction of the arrow 60 along the path 76 cams the lower spreader blade 74 downwardly into the path of the advancing impaling blade 34. Under normal conditions, the support 78 upon which the spreader blade 74 is mounted is returned to its raised position, as determined by the set screw 126, through the action of the spring 106 in time to prevent collision between the blade 34 and the support 78. While the spring 106 can be relied upon to accomplish raising of the spreader blade 74 under average conditions, there may be occasions when upward movement of the spreader blade 74 would be slow or the spring 106 might fail. For these reasons, a safety cam 194 (FIGS. 1 and 2), that is fixed to the conveyor drive shaft 26, is provided. The cam is provided with a plurality of rises 196 which, when any one of them is in engagement with the arm 80 of the blade support 78 (FIG. 1), assures that the blade 74 is raised and out of the way of the oncoming impaling blades 34. Between adjacent rises 196 of the cam 194 is a valley 198 that determines the lowest position to which the support 78 can be moved. The spacing of the rises 196 corresponds to the spacing of the impaling blades 34 and the angular position of the cam 194 on the shaft 26 is such that the support 78 is positively raised each time an impaling blade 34 comes adjacent the lowered spreader blade 74 during the precutting of each peach.

While a particular embodiment of the present invention has been shown and described, it will be understood that the fruit preparation machine of the invention is capable of modification and variation without departing from the principles of the invention and that the scope of the invention should be limited only by the scope and proper interpretation of the claims appended hereto.

The invention having thus been described, what is believed to be new and desired to be protected by Letters Patent is:

1. In a machine for processing drupaceous fruit, means operable to advance a fruit in a predetermined path, a circular pit cutting blade located in said path and arranged to sever the pit of a fruit carried over the blade by said advancing means, a first spreader blade preceding said pit cutting blade at the periphery thereof and having a thickness greater than the thickness of said pit cutting blade and a cutting edge extending in and along said path, said first spreader blade being disposed substantially in the plane of said pit cutting blade, first pivot means mounting said first spreader blade at one side of said path for movement toward and away from said path, the axis of said pit cutting blade and the axis of said first pivot means extending in a plane at said one side of said path, a second spreader blade preceding said pit cutting blade at the periphery thereof and having a thickness substantially equal to the thickness of said first spreader blade and a cutting edge extending into and along said path in the plane of said first spreader blade, second pivot means mounting said second spreader blade at the side of said path opposite to said first spreader blade for movement in the plane of said first spreader blade, the axis of said pit cutting blade and the axis of said second pivot means extending in a plane spaced angularly from the plane in which the axis of said first pivot means extends, said spreader blades converging into nearly touching relation to a position located a distance corresponding approximately to a pit radius inwardly from the diverging planes toward a point in said path and in the direction of fruit advance, and resilient means associated with each of said spreader blades and arranged to urge said blades toward each other, said spreader blades being arranged to spread the fruit meat laterally of the pit cutting blade simultaneously with the pit cutting action thereof.

2. In a preparation machine for drupaceous fruit, first and second guide means extending along a certain route, conveyor means adjacent said guide means and arranged to advance in a certain direction, fruit holder means on said conveyor means and arranged to be advanced thereby, said fruit holder means being arranged to slide the fruit onto and along said first and said second guide means, said first and said second guide means being arranged to confine the fruit advanced in sliding relation therealong to said certain route and to cooperate with said fruit holder means to establish a path for movement of the fruit, a circular pit cutting blade having its cutting edge extending across said path, first and second pivot means mounting said first and said second guide means, respectively, at opposite sides of said path for pivotal movement toward and away from each other, the axes of said first and second pivot means being located at opposite sides of said path in diverging planes radiating from the axis of said circular cutting blade, means providing fruit meat spreader parts on said first and said second guide means thicker than said pit cutting blade and located at opposite sides of said path at the periphery of said pit cutting blade and upstream from and in the plane thereof, said spreader parts having knife edges along a portion of their adjacent edges with the knife edges of said spreader blade means converging in the direction of advance of said fruit holder means and toward a point in said path with said meat spreader parts in near touching relation, and resilient means associated with each of said guide means and arranged to urge said guide means toward each other to a position located a distance corresponding approximately to a pit radius inwardly from the diverging planes, said spreader parts being arranged to spread the fruit meat laterally of the pit cutting blade simultaneously with the pit cutting action thereof.

3. Apparatus for processing drupaceous fruit comprising conveyor means for advancing fruit along a predetermined path, a circular pit cutting blade extending into said path and arranged to sever the pit of the fruit advanced by said conveyor means, first and second spreader blades, each blade having a greater thickness than the thickness of said pit cutting blade and being located in front of and close to the periphery to said pit cutting blade in nearly touching relation therewith, said spreader blades being disposed in coplanar relation with each other and with said pit cutting blade and having cutting edges extending into said path, first and second pivot means mounting said first and second spreader blades, respectively, at opposite sides of said path for coplanar movement toward and away from each other, the axes of said first and second pivot means and the axis of said pit cutting blade defining planes which diverge from the axis of said pit cutting blade to opposite sides of said path, said first and second spreader blades being movable toward each other at least into nearly touching relation into positions wherein each spreader blade extends into said path inwardly from the associated one of said diverging planes a distance corresponding approximately to a pit radius, and resilient means urging said blades toward each other so as to incise the meat of a fruit substantially to the pit as the fruit is advanced by said conveyor means and to spread the meat of the advancing fruit laterally beyond the sides of said pit cutting blade as the pit is severed thereby.

References Cited in the file of this patent
UNITED STATES PATENTS

| | | |
|---|---|---|
| 1,334,162 | Moltzner | Mar. 16, 1920 |
| 1,605,532 | Duncan | Nov. 2, 1926 |
| 1,658,007 | Petersen | Jan. 31, 1928 |
| 1,915,447 | Robbins | June 27, 1933 |
| 2,226,664 | Jepson | Dec. 31, 1940 |
| 2,257,341 | Jepson | Sept. 30, 1941 |
| 2,376,526 | Thompson | May 22, 1945 |
| 2,818,098 | Perrelli | Dec. 31, 1957 |
| 2,858,863 | Lorenzen | Nov. 4, 1958 |